US011193434B2

(12) United States Patent
Tanis et al.

(10) Patent No.: US 11,193,434 B2
(45) Date of Patent: Dec. 7, 2021

(54) TURBOCHARGER CONTROL USING AN INTAKE THROTTLE VALVE

(71) Applicant: Caterpillar Inc., Peoria, IL (US)

(72) Inventors: Derek Tanis, Peoria, IL (US); Sylvain J. Charbonnel, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 27 days.

(21) Appl. No.: 16/699,288

(22) Filed: Nov. 29, 2019

(65) Prior Publication Data

US 2021/0164409 A1 Jun. 3, 2021

(51) Int. Cl.
*F02D 41/00* (2006.01)
*F02B 29/08* (2006.01)
*F02B 37/12* (2006.01)

(52) U.S. Cl.
CPC ........ *F02D 41/0007* (2013.01); *F02B 29/083* (2013.01); *F02B 2037/122* (2013.01); *F02D 2041/002* (2013.01)

(58) Field of Classification Search
CPC .......... F02D 41/0007; F02D 2041/002; F02B 29/083; F02B 37/122; F02M 26/06; F02M 26/27
USPC .............. 60/602, 605.1, 605.2; 701/104, 108
See application file for complete search history.

(56) References Cited

U.S. PATENT DOCUMENTS

| | | | | |
|---|---|---|---|---|
| 4,572,139 A * | 2/1986 | Ishigami | ................. | F02D 41/18 123/564 |
| 4,907,409 A * | 3/1990 | Inoue | .................. | F02D 41/0007 60/602 |
| 5,187,935 A * | 2/1993 | Akiyama | ............ | F02D 41/0007 60/602 |
| 6,687,601 B2 * | 2/2004 | Bale | ........................ | F02M 26/48 60/602 |
| 6,779,344 B2 | 8/2004 | Hartman et al. | | |
| 7,079,937 B2 * | 7/2006 | Tanaka | ..................... | F02D 41/18 701/102 |
| 7,100,375 B2 | 9/2006 | Baize et al. | | |
| 7,805,939 B2 * | 10/2010 | Kimoto | ............... | F02D 41/0007 60/609 |
| 7,814,752 B2 * | 10/2010 | Hu | ....................... | F02D 41/0007 60/602 |
| 7,827,790 B2 * | 11/2010 | Kimoto | ............... | F02D 41/0007 60/607 |
| 8,307,645 B2 | 11/2012 | Mischler et al. | | |
| 8,991,243 B2 * | 3/2015 | Bleile | ................. | F02D 41/0007 73/114.77 |
| 8,997,559 B2 * | 4/2015 | Brandt | .................. | G01M 15/04 73/114.77 |
| 9,181,857 B2 | 11/2015 | Petrovic et al. | | |
| 9,206,747 B2 | 12/2015 | Leone et al. | | |
| 9,574,489 B2 | 2/2017 | Schenker et al. | | |
| 9,957,883 B2 * | 5/2018 | Inoue | .................. | F02D 41/0007 |

(Continued)

FOREIGN PATENT DOCUMENTS

WO WO-2018065053 A1 * 4/2018 ......... F02D 41/0007

*Primary Examiner* — Thai Ba Trieu
(74) *Attorney, Agent, or Firm* — Harrity & Harrity LLP

(57) ABSTRACT

Control of a turbocharger of a power system is disclosed. A controller may receive a desired value for a parameter of an engine. The controller may receive an operating value of the parameter. The controller may set, based on the desired value and the operating value, a position of an intake throttle valve of the engine to control air flow through a turbocharger of the engine.

20 Claims, 3 Drawing Sheets

(56) References Cited

U.S. PATENT DOCUMENTS

| | | | |
|---|---|---|---|
| 10,041,448 B2 | 8/2018 | Glugla | |
| 2009/0266060 A1* | 10/2009 | Guo | F02D 41/029 60/601 |
| 2013/0340720 A1* | 12/2013 | Kuzuyama | F02D 41/30 123/478 |
| 2016/0312728 A1* | 10/2016 | Ge | F02D 41/0007 |
| 2019/0003375 A1* | 1/2019 | Furukawa | F02D 41/0007 |
| 2019/0249606 A1* | 8/2019 | Mohlin | F02D 41/0007 |

* cited by examiner

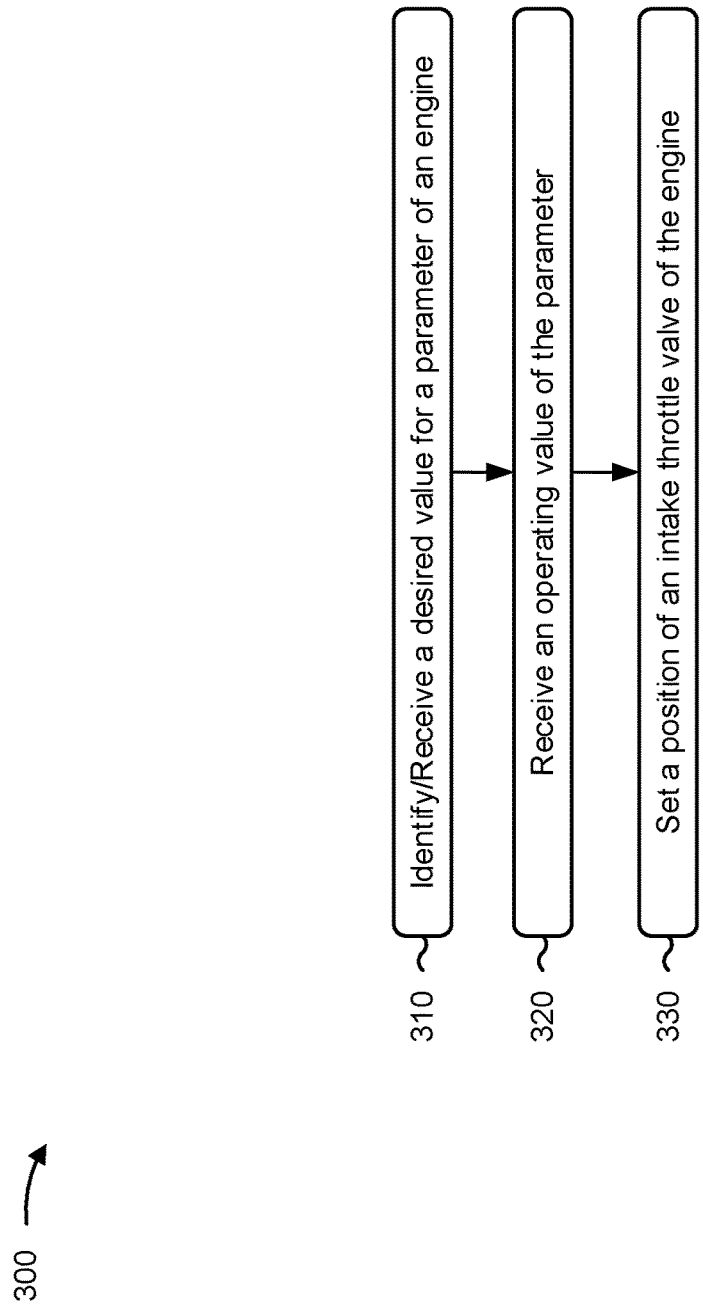

TURBOCHARGER CONTROL USING AN INTAKE THROTTLE VALVE

TECHNICAL FIELD

The present disclosure relates generally to control of a turbocharger of a power system and, for example, to turbocharger control using an intake throttle valve.

BACKGROUND

An electronic control module (ECM) of a power system may facilitate control of the power system according to certain operational conditions and/or limits of certain parameters of the power system. According to previous techniques, power systems that include an engine and a turbocharger (e.g., a turbocharged engine) are to include certain mechanical components to control the turbocharger. For example, a wastegate or other mechanical exhaust control component may be included to control exhaust flow of the engine to the turbocharger (e.g., to increase or decrease a rotational speed of the turbocharger). Such additional mechanical components for controlling the turbocharger increase cost and complexity of the engines.

One approach to limit rotational speed of a turbocharger is disclosed in U.S. Pat. No. 7,100,375 that issued to Baize et al. on Sep. 5, 2006 ("the '375 patent"). In particular, the '375 patent discloses controlling a swallowing capacity and/or efficiency of a turbocharger turbine. The swallowing capacity is defined in the '375 patent as the exhaust gas flow capacity of the turbocharger turbine.

While the '375 patent may describe control of the swallowing capacity to affect a number of engine operating conditions, the '375 patent discloses use of a variable geometry actuator, a wastegate, or an exhaust throttle as control mechanisms.

The turbocharger controller of the present disclosure solves one or more of the problems set forth above and/or other problems in the art.

SUMMARY

According to some implementations, a method may include determining a desired value for a parameter of an engine; determining an operating value of the parameter; determining that a difference between the desired value and the operating value is outside of a threshold range; and causing, based on the difference, a position of an intake throttle valve to be adjusted to control a rotational speed of a turbocharger of the engine to reduce the difference between the desired value and the operating value.

According to some implementations, a device may include a memory and a processor, communicatively coupled to the memory, configured to: receive a desired value for a parameter of an engine; receive an operating value of the parameter; and set, based on the desired value and the operating value, a position of an intake throttle valve of the engine to control air flow through a turbocharger of the engine.

According to some implementations, a power system may include an engine that includes a turbocharger and an intake throttle valve; a sensor system; and an electronic control module configured to: determine a desired value for a parameter of the engine; determine, based on a measurement from the sensor system, an operating value of the parameter; and control, based on the desired value and the operating value, a position of the intake throttle valve to control a rotational speed of the turbocharger.

BRIEF DESCRIPTION OF THE DRAWINGS

FIG. 3 is a flowchart of an example process associated with controlling a turbocharger of a power system, as described herein.

DETAILED DESCRIPTION

This disclosure relates to a turbocharger controller that controls a turbocharger using an intake throttle valve (ITV) of a power system. The turbocharger controller, as described herein, has universal applicability to any machine utilizing such a power system with a turbocharged engine. The term "machine" may refer to any machine that performs an operation associated with an industry such as, for example, mining, construction, farming, transportation, or any other industry. As some examples, the machine may be a vehicle, a backhoe loader, a cold planer, a wheel loader, a compactor, a feller buncher, a forest machine, a forwarder, a harvester, an excavator, an industrial loader, a knuckleboom loader, a material handler, a motor grader, a pipelayer, a road reclaimer, a skid steer loader, a skidder, a telehandler, a tractor, a dozer, a tractor scraper, or other above ground equipment, underground equipment, or marine equipment.

Figure 1:
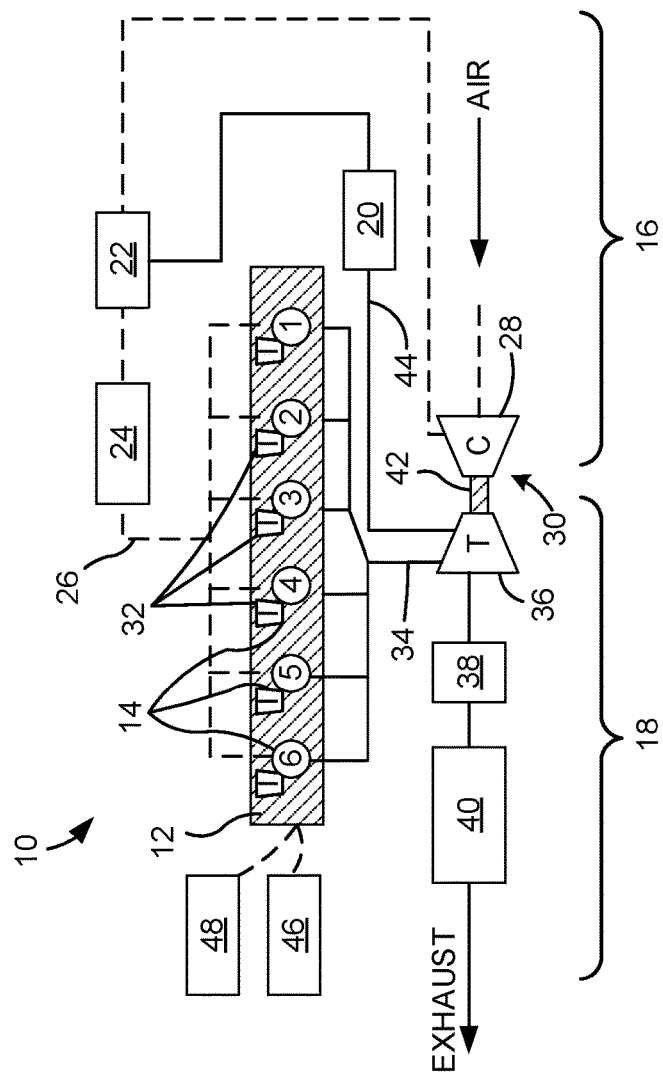
FIG. 1 is a diagram of an example power system described herein.

FIG. 1 is a diagram of an example power system 10 described herein. The power system 10 may be described herein as a compression ignition, internal combustion engine. However, the power system 10 may include any other type of internal combustion engine, such as, for example, a spark, laser, or plasma ignition engine. The power system 10 may be fueled by such fuels as distillate diesel fuel, biodiesel, dimethyl ether, gaseous fuels, such as hydrogen, natural gas, propane, alcohol, ethanol, and/or any combination thereof. Furthermore, the power system 10 may consume one or more consumable resources (e.g., a fuel (e.g., gasoline, diesel fuel, and/or the like), a diesel exhaust fluid (DEF), one or more coolants, one or more lubricants (e.g., an oil, a grease, and/or the like), and/or the like) during operation (e.g., due to combustion in engine 12).

Power system 10, of FIG. 1, includes an engine block 12 (referred to herein as "engine 12") with a plurality of cylinders 14 (engine 12 of FIG. 1 is shown with six cylinders 14 (numbered 1, 2, 3, 4, 5, 6)). A piston assembly may be included within each of cylinders 14 to form a combustion chamber within each cylinder 14. Power system 10 may include any number of combustion chambers and the combustion chambers may be disposed in an in-line configuration, a "V" configuration, or in any other suitable configuration.

Power system 10 may include multiple systems. For example, as shown in the example of FIG. 1, power system 10 may include an air intake or air induction system 16, an exhaust system 18, and an exhaust gas recirculation (EGR) system 20. Air induction system 16 may be configured to direct air, or an air and fuel mixture (e.g., of air and another gas, such as exhaust gas) into power system 10 for subsequent combustion. Exhaust system 18 may exhaust or release byproducts of the combustion to an atmosphere external to power system 10. A recirculation loop of the EGR system 20 may be configured to direct a portion of the exhaust gases from exhaust system 18 back into air induction system 16 for subsequent combustion.

Air induction system 16 may include multiple components that coordinate to condition and introduce compressed air into cylinders 14. For example, air induction system 16 may include a mixer 22, an ITV 24, and/or intake manifold 26, located downstream of a compressor 28 of a turbocharger 30. The air induction system 16 feeds variable valve actuators 32 associated with respective ones of cylinders 14. In some implementations, air induction system 16 may include an air cooler, a filtering component, a compressor bypass component, and/or the like.

As described herein, a position of ITV 24 associated with air induction system 16 may be controlled to adjust an operating value of a parameter of turbocharger 30 and/or power system 10. For example, the position of ITV 24 may be set according to one or more desired values (e.g., associated with an optimization of power system 10) of the parameter and the operating value of the parameter. The operating value of the parameter may correspond to a current and/or measured value of the parameter determined based on one or more measurements from one or more sensors of power system 10. The parameter may correspond to a rotational speed of turbocharger 30, an intake manifold air pressure (IMAP) associated with intake manifold 26, an air-to-fuel ratio (AFR) measured at an outlet of variable valve actuators 32, and/or the like. In some implementations, an optimization process may be performed to determine the desired value for the parameter. For example, the optimization process may be performed to determine an optimized value (e.g., a desired IMAP) for how compressed air is when the air enters a combustion chamber (e.g., by adjusting a setting of compressor 28), timing of the air as the air enters the combustion chamber (e.g., by adjusting opening and closing timing of variable valve actuators 32), an intake throttle valve position (e.g., by adjusting a position of an intake throttle valve of air induction system 16), and/or the like.

Exhaust system 18 may include multiple components that cooperate to condition and direct exhaust from cylinders 14 to the atmosphere. For example, exhaust system 18 may include an exhaust passageway 34, a turbine 36 driven by exhaust flowing through exhaust passageway 34, a particulate collection device 38, such as a diesel particulate filter (DPF) located downstream of turbine 36, and an exhaust aftertreatment device 40 (e.g., an aftertreatment selective catalytic reduction (SCR) component) fluidly connected downstream of particulate collection device 38.

Turbine 36 may be located to receive exhaust leaving cylinders 14 and may be connected to compressor 28 of air induction system 16 by way of a turbocharger shaft 42 to form turbocharger 30. Turbocharger shaft 42 may be a common shaft of turbine 36 and compressor 28 such that a rotational speed of turbine 36 corresponds to a rotational speed of compressor 28. As described herein, a rotational speed of turbocharger 30 may correspond to or be based on the rotational speed of turbocharger shaft 42. As exhaust gases exiting cylinders 14 flow through turbine 36 and expand against vanes thereof, turbine 36 may rotate and drive compressor 28 to pressurize inlet air to mixer 22.

In some implementations, particulate collection device 38 may be a DPF located downstream of turbine 36 to remove particulate matter from the exhaust flow of power system 10. In some implementations, particulate collection device 38 may include an electrically conductive or non-conductive coarse mesh metal or porous ceramic honeycomb medium. As the exhaust flows through the medium, particulates may be blocked by and/or trapped in the medium. Over time, the particulates may build up within the medium and, if unaccounted for, could affect engine performance by increasing exhaust backpressure. To minimize backpressure effects on engine performance, the collected particulates may be passively and/or actively removed through a regeneration process. When passively regenerated, the particulates deposited on the medium may chemically react with a catalyst, for example, a base metal oxide, a molten salt, and/or a precious metal that is coated on or otherwise included within particulate collection device 38 to lower the ignition temperature of the particulates. Because particulate collection device 38 may be closely located downstream of engine 12 (e.g., immediately downstream of turbine 36), the temperatures of the exhaust flow entering particulate collection device 38 may be controlled to be high enough, in combination with the catalyst, to burn away the trapped particulates. When actively regenerated, heat is applied to the particulates deposited on the filtering medium to elevate the temperature thereof to an ignition threshold. An active regeneration device (not shown), such as a fuel-fired burner or an electric heater, may be proximally located (e.g., upstream of) near particulate collection device 38 to assist in controlling the regeneration of the particulate collection device 38. A combination of passive and active regeneration may be utilized.

Exhaust aftertreatment device 40 may receive exhaust from turbine 36 and trap or convert particular constituents in the gas stream. In one example, exhaust aftertreatment device 40 may embody an SCR component having a catalyst substrate located downstream from a reductant injector. A gaseous or liquid reductant (e.g., urea or a water and urea mixture) may be sprayed or otherwise advanced into the exhaust upstream of the catalyst substrate by a reductant injector. As the reductant is absorbed onto the surface of the catalyst substrate, the reductant may react with nitrogen oxides (NOx) (NO and $NO_2$) in the exhaust gas to form water ($H_2O$) and elemental nitrogen ($N_2$). In some embodiments, a hydrolysis catalyst may be associated with a catalyst substrate to promote even distribution and conversion of urea to ammonia ($NH_3$).

In some implementations, the reduction process may also include an oxidation catalyst, which, for example, may include a porous ceramic honeycomb structure or a metal mesh substrate coated with a material, for example a precious metal, that catalyzes a chemical reaction to alter the composition of the exhaust. For example, the oxidation catalyst may include platinum that facilitates the conversion of NO to NO2, and/or vanadium that suppresses the conversion.

The exhaust aftertreatment device 40 may require desulphation to maintain an acceptable NOx conversion rate. Similar to a regeneration event of the particulate collection device 38, the desulphation event may require increased exhaust temperatures. Decoupling an intake valve actuation (IVA) control from EGR system 20 during desulphation, for example, may provide enhanced capability for thermal management of the exhaust during such maintenance events.

As described herein, various parameters associated with exhaust system 18 may be monitored and/or optimized to control ITV 24. For example, a position of ITV 24 may be controlled according to a rotational speed of turbine 36 (e.g., determined from a measurement of a speed sensor associated with turbocharger 30), an inlet temperature or outlet temperature of exhaust of turbine 36 (e.g., determined from a measurement of a temperature sensor associated with exhaust system 18), and/or gaseous emissions and/or particulate emissions (e.g., determined from a measurement of an emissions sensor of exhaust passageway 34, particulate collection device 38, exhaust aftertreatment device 40, and/or the like), and/or the like. Additionally, or alternatively, an optimization process may be iteratively performed to optimize an open area of an exhaust backpressure valve (e.g., by adjusting a position of a backpressure valve of exhaust system 18), a mass flow through particulate collection device 38 (e.g., by performing active and/or passive regeneration via particulate collection device 38), a pressure of the exhaust gases (e.g., by adjusting a temperature and/or a pressure in the exhaust downstream from turbine 36), and/or the like.

EGR system 20 may redirect gases from exhaust system 18 back into air induction system 16 for subsequent combustion. EGR is a process whereby exhaust gas from engine 12 is recirculated back into air induction system 16 for subsequent combustion. The recirculated exhaust gases may reduce the concentration of oxygen within the combustion chambers, and simultaneously lower the maximum combustion temperature therein. The reduced oxygen levels may provide fewer opportunities for chemical reaction with the nitrogen present, and the lower temperature may slow the chemical process that results in the formation of NOx. As mentioned above, a cooler may be included to cool the exhaust gases before the gases are combusted.

When utilizing EGR in a turbocharged diesel engine, as shown in FIG. 1, exhaust gas that is to be recirculated may be removed upstream of the exhaust gas driven turbine 36 associated with turbocharger 30. For example, in many EGR applications, a portion of the exhaust gas may be diverted, via turbine 36, from exhaust passageway 34 to an EGR conduit 44 into air induction system 16. Likewise, the recirculated exhaust gas may be re-introduced to the air induction system 16 downstream of compressor 28. In some implementations, EGR system 20 may be an external EGR system and/or may include various features for implementation of the methods described herein, such as a system of primary control and/or bypass valves to allow an ECM 46 to control various flows through EGR system 20 during selected engine operating conditions.

As described herein, various parameters associated with EGR system 20 may be monitored and/or optimized according to an optimization process. Additionally, or alternatively, an optimization process may be iteratively performed to optimize a mass flow of exhaust gas through EGR system 20 (e.g., by adjusting an EGR bypass valve and/or the like connected to EGR conduit 44) and/or the like.

Power system 10 of FIG. 1 includes ECM 46. ECM 46 may provide control of power system 10 based on determining desired values for operating power system 10 and/or monitoring operating parameters of power system 10 to control ITV 24 to affect values of the operating parameters of power system 10. For example, ECM 46 may control ITV 24 to adjust air flow of air induction system 16 to control a rotational speed of turbocharger 30, an IMAP of power system 10, an AFR of power system 10, and/or the like. ECM 46 may monitor and/or detect operating values of one or more parameters of power system 10 based on one or more measurements, associated with the one or more parameters of power system 10, received from sensor system 48. In some implementations, ECM 46 may monitor and/or detect the rotational speed of turbocharger 30, the IMAP, the AFR, and/or the like in order to set a position of ITV 24 to cause an adjustment to the rotational speed of turbocharger 30, the IMAP, and/or the AFR.

ECM 46 may execute the instructions to perform various control functions and processes to control power system 10 and to automatically adjust adjustable parameters of power system 10. ECM 46 may include any appropriate type of engine control system configured to perform engine control functions such that power system 10 may operate properly. Further, ECM 46 may also control another system of a vehicle or machine, such as a transmission system, a hydraulics system, and/or the like.

Sensor system 48 may provide measurements associated with various parameters used by ECM 46 to control turbocharger 30 and/or power system 10 and/or to determine optimized values for one or more parameters of power system 10. Sensor system 48 may include physical sensors and/or any appropriate type of measurement system that generates measurements for values of parameters of power system 10 based on a computational model and/or one or more measured values.

As used herein, a parameter may refer to an operating condition of power system 10 that can be directly measured and/or estimated by one or more sensors (e.g., physical sensors, virtual sensors, and/or the like) of sensor system 48 or controlled by ECM 46. As described herein, the sensors may include speed sensors, pressure sensors, temperature sensors, content sensors, and/or the like. A value for a parameter may include any sensed measurement or output from the sensors and/or any value that may be measured indirectly by physical sensors and/or calculated based on readings of physical sensors. Measurements of a parameter, as used herein, may refer to any value relevant to the parameter and indicative of the state of a corresponding operating condition of the power system 10. For example, a measurement may include a value of a machine parameter and/or environmental parameter, such as a speed value (e.g., of turbocharger 30, of an output of engine 12, and/or the like), a pressure value, a temperature value, an AFR value, a compression ratio, a turbocharger efficiency value, an exhaust measurement value, an ambient condition value, a fuel rate, and/or the like. A measurement may be included as an input to be provided to one or more virtual sensors.

Sensor system 48 may be configured to coincide with ECM 46, may be configured as a separate control system, and/or may be configured as a part of other control systems. Further, ECM 46 may implement the sensor system 48 by using computer software, hardware, or a combination of software and hardware. For example, ECM 46 may execute instructions to cause sensors of sensor system 48 to sense and/or generate operating values for parameters of power system 10 based on a computational model and other parameters.

In operation, computer software instructions may be stored in or loaded to ECM 46. ECM 46 may execute the computer software instructions to perform various control functions and processes to control power system 10 and to automatically adjust operational parameters, such as one or more air flows through power system 10, fuel injection timing and fuel injection pressure, rotational speed of engine 12 and/or turbocharger 30, and/or the like. Additionally, or alternatively, ECM 46 may execute computer software instructions to generate and/or operate sensor system 48 to provide engine temperature values, engine pressure values, engine emission values, engine speed values, actuator or valve position values, and/or other parameter values used to monitor and/or control power system 10.

Accordingly, ECM 46 may also identify, obtain, and/or determine values for parameters (e.g., desired values and/or operational values) that are associated with conditions (e.g., as sensed by sensor system 48) or settings corresponding to the operations of power system 10, such as engine speed, turbocharger speed, fuel rate or quantity, injection timing, intake manifold air temperature (IMAT), IMAP, intake valve actuation (IVA) position, IVA timing, position of ITV 24, injection air pressure, injection fuel pressure, torque delivered by engine 12, total fuel injection quantity, exhaust pressure, number of cylinders 14 firing, oxygen/fuel molar ratio, ambient temperature, ambient pressure (e.g., barometric pressure), mass flow through particulate collection device 38, exhaust backpressure valve position, shot mode, coolant temperature, total induction mass flow in multi-shot mode, dwell (e.g., length of time between shots) in multi-shot mode, and/or the like.

As indicated above, FIG. 1 is provided as an example. Other examples are possible and may differ from what was described in connection with FIG. 1.

Figure 2:
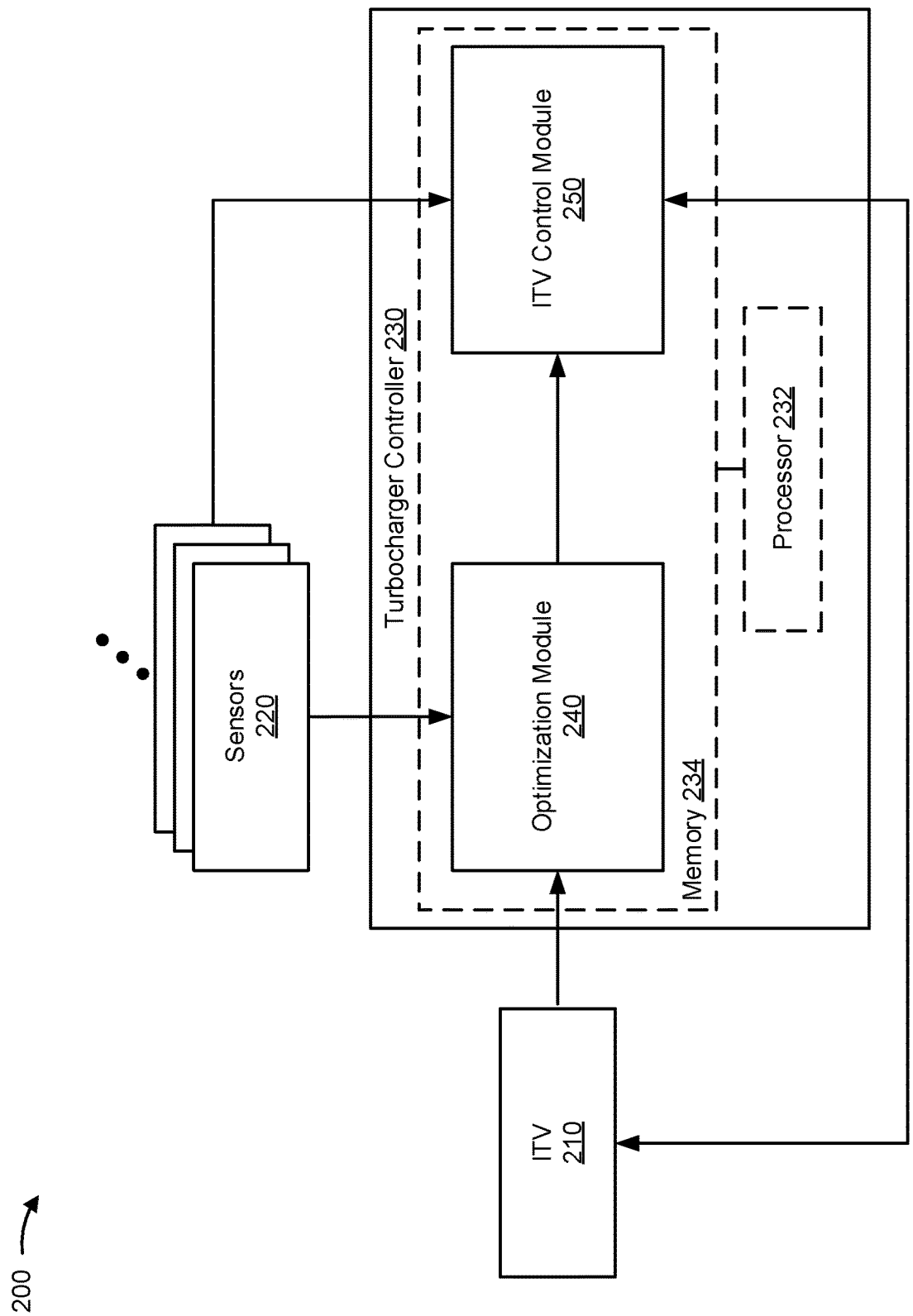
FIG. 2 is a diagram of an example control system that may be included within the power system of FIG. 1, as described herein.

FIG. 2 is a diagram of an example control system 200 in which systems and/or methods described herein may be implemented. As shown in FIG. 2, control system 200 includes an ITV 210 (which may correspond to ITV 24 of FIG. 1), one or more sensors 220 (referred to individually as "sensor 220" and collectively as "sensors 220"), and a turbocharger controller 230. As shown in FIG. 2, turbocharger controller 230 may include a processor 232, a memory 234, an optimization module 240, and an ITV control module 250. As described herein, turbocharger controller 230 is implemented in hardware via processor 232 and/or memory 234.

ITV 210 may be any type of component and/or device that may be used by turbocharger controller 230 to control air flow of an intake of engine 12 of FIG. 1 (and/or any other type of engine). For example, ITV 210 may include one or more actuators, switches, integrated circuits (ICs), and/or the like that are capable of opening and/or closing a valve fluidly coupled with an intake of the engine. ITV 210 may be a binary valve that has an open position (e.g., a position that enables air flow to the engine) and a closed position (e.g., a position that prevents air flow to the engine). In some implementations, ITV 210 may include a variable position valve that can be controlled to vary the geometry of an intake of the engine. For example, ITV 210 may be set to variable positions between 100% closed (e.g., a position that prevents most or all air flow to the engine) and 100% open (e.g., a position that does not prevent or minimally prevents air flow to the engine).

As described herein, the position of ITV 210 may affect one or more parameters associated with engine 12. Specifically, the position of ITV 210 may affect a parameter of turbocharger 30, such as a rotational speed of turbocharger 30. For example, when partially or fully closed, the reduced (or eliminated) air flow to intake manifold 26 may reduce the rotational speed of turbocharger 30 (e.g., due to engine 12 being choked). On the other hand, when fully open, uninhibited air flow to intake manifold 26 may enable a rotational speed of turbocharger 30 to be maintained and/or increased (e.g., due to increased flow of exhaust caused by the uninhibited air flow to intake manifold 26). As described herein, a setting of ITV 210 may be determined by ITV control module 250 and/or optimization module 240. The setting of ITV 210 may represent, indicate, or correspond to one or more of a position of an actuator, a length of time that a valve is open, a position of the valve, an IMAP that is to be achieved by ITV 210, and/or the like.

Sensor 220 may include any type of sensor configured to measure operating conditions of power system 10 (e.g., to determine operating values corresponding to the operating conditions). Sensors 220 may be sensors of sensor system 48, as described herein. For example, sensors 220 may include temperature sensors to detect temperature of air, exhaust, a component, coolant, and/or the like. Sensors 220 may include position sensors to detect a position of a valve, an actuator, an engine part (e.g., a piston), and/or the like. Sensors 220 may include speed sensors (e.g., to detect a turbocharger speed, an engine speed, a machine speed, and/or the like). Sensors 220 may include pressure sensors to detect a measure of compression of air or exhaust in power system 10. Sensors 220 may include content sensors, such as emissions sensors to detect emission levels of power system 10, such as an amount of NOx, an amount of carbon monoxide, an amount of hydrocarbon, an amount of particulate matter, an amount of soot, and/or the like.

Accordingly, one or more sensors 220 may be associated with one or more parameters (e.g., corresponding to operating conditions of engine 12) that may be monitored to determine an operating condition (e.g., in real-time) of power system 10, as described herein. For example, a value of a parameter associated with a sensor 220 may represent or indicate a measurement of the sensor 220, such as a measured speed of turbocharger 30 by a speed sensor, a measured pressure (e.g., peak cylinder pressure (PCP), IMAP, a compressor surge margin, and/or the like) by a pressure sensor, a measured temperature (e.g., turbine inlet exhaust temperature, turbine outlet exhaust temperature, a compressor outlet temperature, and/or the like) by a temperature sensor, a measured AFR determined using a position sensor and/or pressure sensor (e.g., based on timing of a fuel supply valve not shown in the drawings) opening and/or closing and an intake pressure), a measured position of an actuator (e.g., a position of ITV 210) by a position sensor, measured emission amounts by an emissions sensor, and/or the like.

Turbocharger controller 230 may correspond to ECM 46 of FIG. 1. Processor 232 is implemented in hardware, firmware, and/or a combination of hardware and software. Processor 232 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. Processor 232 includes one or more processors capable of being programmed to perform a function. Memory 234 includes a random-access memory (RAM), a read only memory (ROM), and/or another type of dynamic or static storage device (e.g., a flash memory, a magnetic memory, and/or an optical memory) that stores information and/or instructions for use by processor 232 (e.g., information and/or instructions associated with optimization module 240, ITV control module 250, and/or the like).

Optimization module 240 may include one or more components or devices configured to perform an optimization process to identify optimized operational settings for engine 12, as described herein. As shown, optimization module 240 may be included within and/or implemented by turbocharger controller 230 (and/or ECM 46). Optimization module 240 may be configured via a user interface and/or a default setting to identify adjustable parameters of power system 10 and optimize values for various sets or various quantities of adjustable parameters of power system 10 using one or more optimization processes. For example, in some implementations, a user and/or manufacturer (e.g., a manufacturer of power system 10) may configure optimization module 240 to optimize multiple sets of adjustable parameters of power system 10 via any suitable optimization processes. Based on the optimization processes, optimization module 240 may be configured to determine desired values for the parameters, and, correspondingly, enable control of a turbocharger and/or an engine according to the desired values.

According to some implementations, optimization module 240 may correspond to an optimization model that is configured to perform optimization processes according to operating conditions of engine 12. For example, optimization module 240 may be configured to determine desired values for certain parameters according to an engine speed of engine 12 (e.g., a rotational speed of an output of engine 12, a transmission of engine 12, and/or the like), an amount of brake torque, an IMAP, an IMAT, a barometric pressure, an ambient temperature, and/or the like. Additionally, or alternatively, optimization module 240 may determine the desired values according to one or more constraints (e.g., minimums and/or maximums) for certain parameters of engine 12 a particular maximum and/or minimum fuel injection setting (e.g., amount, timing, and/or the like), a maximum PCP, a maximum exhaust temperature, a maximum rotational speed of the turbocharger, a maximum compressor outlet temperature, a maximum turbine outlet temperature, a minimum compressor surge margin, a maximum soot and/or particular matter emissions level, a maximum gaseous emissions level, and/or the like. The constraints may be configured for the optimization process in order to optimize (e.g., according to an optimization model of optimization module 240) a particular operational metric of engine 12 (e.g., transient response, torque delivered vs. torque desired, speed, durability (or life span), fuel consumption, and/or the like).

Based on operating values of one or more of the above, optimization module 240 may determine a desired value for a particular parameter of engine 12. For example, optimization module 240 may determine a desired turbocharger speed (e.g., a rotational speed of turbocharger 30), a desired IMAP (e.g., a desired pressure of intake manifold 26), or a desired AFR (e.g., a desired AFR for injection in cylinders 14). Optimization module 240 may provide the desired values to ITV control module 250 to permit ITV control module to control a setting of ITV 210 based on one or more operating conditions of power system 10. In some implementations, depending on which characteristic of engine 12 is to be optimized (e.g., according to the model of optimization module 240), the desired value may correspond to a value of one or more of the constraints identified above.

ITV control module 250 may include one or more components or devices configured to control ITV 210. For example, ITV control module 250 may be configured to send a signal, a command, instructions, and/or the like that indicate a setting of ITV 210. More specifically, ITV control module 250 may indicate that ITV 210 is to be in a particular position (e.g., open, partially closed (e.g., at a particular position that adjusts a geometry of an air flow to intake manifold 26), closed, and/or the like). ITV control module 250 may control ITV 210 (e.g., determine the setting for ITV 210) based on receiving a desired value for a parameter of power system 10 (e.g., from optimization module 240) and an operating value for the parameter (and/or other parameters) of power system 10.

ITV control module 250 may monitor operating values for one or more parameters of power system 10 based on measurements from sensors 220. For example, ITV control module 250 may receive a measurement for a parameter from sensor 220 that corresponds to a desired value for the parameter that is received from optimization module 240. More specifically, ITV control module 250 may receive a desired turbocharger speed from optimization module 240 and receive speed measurements of the rotational speed of turbocharger 30 to determine whether the rotational speed of turbocharger 30 matches or is within a threshold range (e.g., a tolerance, such as an industry standard tolerance or a design tolerance) of the desired turbocharger speed. Accordingly, ITV control module 250 may monitor measurements from sensors 220 to ensure that an operating condition (corresponding to an operating value represented by the measurement) of power system 10 corresponds to a desired condition of power system 10.

As described herein, ITV control module 250 may determine a difference between a desired value (e.g., received from optimization module 240) and an operating value (e.g., received from sensor 220) and control ITV 210 according to the difference between the desired value and the operating value. For example, ITV control module 250 may set a position for ITV 210 as a function of the difference between the desired value and the operating value and the type of parameter associated with the desired value and the operating value. Additionally, or alternatively, ITV control module 250 may utilize a mapping of value differences of a parameter to corresponding adjustments to ITV 210. The mapping may be stored and/or maintained in a data structure (e.g., a database, a table, an index, a graph, and/or the like) of memory 234. Such a data structure may include a plurality of mappings for corresponding parameters that are monitored to control ITV 210, as described herein. In some implementations, the mapping associated with ITV control module 250 may include values (e.g., speed values, pressure values, temperature values, emissions levels, and/or the like) associated with certain constraints of certain parameters and/or components of power system 10.

According to some implementations, ITV control module 250 may monitor parameters of power system 10 relative to one or more constraints for the parameters. In such a case, the constraints may correspond to the above desired values for the parameters that are analyzed above. Accordingly, ITV control module 250 may ensure that power system 10 does not operate outside of certain constraints regardless of received optimization values from optimization module 240. For example, ITV control module 250 may receive or determine an operating value for a parameter from sensor 220, compare the operating value to a constraint for the parameter, and control ITV 210 based on the operating value approaching the constraint, being within a threshold range of the constraint, breaching the constraint, and/or the like. In this way, regardless of optimization values that are determined by optimization module 240 and/or used to control power system 10, ITV control module 250 may control ITV 210 to ensure that constraints for certain parameters are not breached.

As a specific example, optimization module 240 may be configured to provide and/or control power system 10 to operate with a desired IMAP. However, for ECM 46 to control the power system 10 to have the desired IMAP, the maximum turbocharger speed would be breached (e.g., due to certain operational conditions of power system 10, characteristics of an optimization model of the optimization module 240, and/or the like). In such a case, the ITV control module 250 may set ITV 210 to a particular position to prevent the maximum turbocharger speed from being breached. In some implementations, ITV control module 250 may provide feedback to optimization module 240 that the position of ITV 210 was adjusted and/or indicate that the maximum turbocharger speed would have been breached but for the adjustment to ITV 210. Based on the feedback, an optimization model (which may be or may include a machine learning model) of optimization module 240 may learn that the previous optimization values, under those operating conditions, cannot be utilized because the maximum turbocharger speed would be breached. Correspondingly, optimization module 240 may determine a new set of optimization values under the current operating conditions (e.g., based on the set position of ITV 210 and/or the maximum turbocharger speed).

Accordingly, as described herein, turbocharger controller 230 of control system 200 may be configured to use ITV 210 to control one or more parameters of power system 10. In this way, turbocharger controller 230 may control a turbocharger without utilizing a wastegate of an exhaust system of the engine or adjusting a fuel injection setting of the engine (e.g., because ITV 210 can be used to adjust the parameter).

The number and arrangement of devices shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of control system 200 may perform one or more functions described as being performed by another set of devices of control system 200.

FIG. 3 is a flowchart of an example process 300 for turbocharger control using an ITV. In some implementations, one or more process blocks of FIG. 3 may be performed by turbocharger controller (e.g., turbocharger controller 230). In some implementations, one or more process blocks of FIG. 3 may be performed by another device or a group of devices separate from or including the turbocharger controller 230, such as an ECM (e.g., ECM 46), a sensor (e.g., a sensor of sensor system 48, sensor 220, and/or the like), and/or the like.

As shown in FIG. 3, process 300 may include receiving a desired value for a parameter of an engine (block 310). For example, the turbocharger controller (e.g., using processor 232, memory 234, optimization module 240, ITV control module 250, and/or the like) may receive a desired value for a parameter of an engine, as described above. The desired value may be determined according to an optimization model that is configured to determine an optimal value for the parameter.

In some implementations, the parameter comprises at least one of: a rotational speed of the turbocharger, an intake manifold pressure of an intake of the engine, or an air-to-fuel ratio measured at the intake of the engine.

As further shown in FIG. 3, process 300 may include receiving an operating value of the parameter (block 320). For example, the turbocharger controller (e.g., using processor 232, memory 234, optimization module 240, ITV control module 250, and/or the like) may receive an operating value of the parameter, as described above.

The parameter may correspond to the rotational speed of the turbocharger, and the operating value may be determined based on receiving a rotational speed measurement from a speed sensor associated with the turbocharger. The parameter may correspond to an IMAP of the engine, and the operating value may be determined based on receiving a pressure measurement from a pressure sensor associated with an intake manifold of the engine. The parameter may correspond to an AFR of the engine, and the operating value may be determined based on a fuel measurement from a fuel sensor associated with an intake of the engine. The parameter may correspond to an emissions level of the engine, and the operating value may be determined based on an emissions measurement from an emissions sensor associated with an exhaust system of the engine.

As further shown in FIG. 3, process 300 may include setting a position of an ITV of the engine (block 330). For example, the turbocharger controller (e.g., using processor 232, memory 234, optimization module 240, ITV control module 250, and/or the like) may set, based on the desired value and the operating value, a position of an ITV of the engine to control air flow through a turbocharger of the engine, as described above. The ITV may be positioned between a compressor of the turbocharger and an intake manifold of the engine.

In some implementations, when setting the position, the turbocharger controller may determine a difference between the desired value and the operating value and control the air flow based on the difference. The turbocharger controller may determine that the difference between the desired value and the operating value is outside of a threshold range. The turbocharger controller may cause the position of the ITV to be adjusted to control a rotational speed of a turbocharger of the engine (e.g., to reduce the difference between the desired value and the operating value).

In some implementations, when the desired value is less than the operational value, the turbocharger controller may set the position of the intake throttle valve to a closed position. Additionally, or alternatively, when the desired value is greater than the operational value, the turbocharger controller may set the position of the intake throttle valve to an open position. In some implementations, the intake throttle valve is a variable position valve, and the position is between 100% open and 100% closed based on a degree of difference between the desired value and the operating value.

Although FIG. 3 shows example blocks of process 300, in some implementations, process 300 may include additional blocks, fewer blocks, different blocks, or differently arranged blocks than those depicted in FIG. 3. Additionally, or alternatively, two or more of the blocks of process 300 may be performed in parallel.

INDUSTRIAL APPLICABILITY

During operation, an ECM may be configured to optimize a set of parameters (e.g., using an optimization model) and/or control the operation of a power system according optimization values for the set of parameters. In some instances, optimization values for the set of parameters may cause certain components of the power system to operate outside of critical ranges and/or design constraints that are configured to maintain the performance features and/or operational characteristics.

As described herein, control system 200 may utilize ITV 210 to control the power system 10 based on a desired operating condition and an actual operating condition of power system 10. For example, turbocharger controller 230 of control system 200 may set a position of ITV 210 to adjust air flow to intake manifold 26 to affect a rotational speed of turbocharger 30. Accordingly, turbocharger controller 230 may control the rotational speed of turbocharger 30 to stay within a designed operational range of turbocharger 30. Maintaining the rotational speed of turbocharger 30 to be within the designed operational range may enhance the durability and life span of the turbocharger, thus reducing costs associated with replacing turbocharger 30 due to turbocharger 30 operating outside of the designed operational range.

Furthermore, control system 200 enables control of turbocharger 30 (e.g., a rotational speed of turbocharger 30) without utilizing a wastegate or other mechanical component within exhaust system 18. Therefore, control system 200 enables a reduction in hardware resources and/or engine compartment volume for a machine that is to include a turbocharge engine because there is no need for a wastegate or any other similar component in exhaust system 18 to control turbocharger 30. Furthermore, control system 200 enables a reduction in design resources (e.g., computing resources, power resources, and/or the like) for the machine because exhaust system 18 may be relatively simplified by not including a wastegate or any other similar component to control turbocharger 30.

Furthermore, control system 200 may enable control of turbocharger 30 without adjusting a fuel injection setting of power system 10. For example, if a rotational speed of turbocharger 30 is to be reduced, turbocharger controller 230 may cause ITV 210 to reduce air flow to slow the rotational speed without reducing an amount of fuel being injected into cylinders 14 of engine 12. In such a case, turbocharger controller 230 permits engine 12 to maintain a desired torque or power output while reducing the speed of turbocharger controller 230. Accordingly, engine 12 may achieve a desired performance without letting turbocharger 30 enter a hazardous operating condition (e.g., reach a rotational speed that is greater than the maximum turbocharger speed).

As used herein, the articles "a" and "an" are intended to include one or more items and may be used interchangeably with "one or more." Also, as used herein, the terms "has," "have," "having," or the like are intended to be open-ended terms. Further, the phrase "based on" is intended to mean "based, at least in part, on."

The foregoing disclosure provides illustration and description but is not intended to be exhaustive or to limit the implementations to the precise form disclosed. Modifications and variations may be made in light of the above disclosure or may be acquired from practice of the implementations. It is intended that the specification be considered as an example only, with a true scope of the disclosure being indicated by the following claims and their equivalents. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

What is claimed is:

1. A control system for operating an engine, comprising:
   a memory; and
   a processor, communicatively coupled to the memory, configured to:
     receive a desired value for a parameter of the engine;
     receive, from a sensor, an operating value of the parameter of the engine; and
     set, based on the desired value and the operating value, a position of an intake throttle valve of the engine to control air flow through a turbocharger of the engine.

2. The control system of claim 1, wherein the parameter of the engine comprises at least one of:
   a rotational speed of the turbocharger,
   an intake manifold pressure of an intake of the engine, or
   an air-to-fuel ratio measured at the intake of the engine.

3. The control system of claim 1, wherein the processor is further configured to:
   determine a difference between the desired value and the operating value, and
   set the position of the intake throttle valve of the engine to control the air flow based on the determined difference.

4. The control system of claim 1, wherein, when the desired value is less than the operational value, the processor is configured to:
   set the position of the intake throttle valve to a closed position.

5. The control system of claim 1, wherein, when the desired value is greater than the operational value, the processor is configured to:
   set the position of the intake throttle valve to an open position.

6. The control system of claim 1,
   wherein the intake throttle valve is a variable position valve, and
   wherein the position is between 100% open and 100% closed based on a degree of difference between the desired value and the operating value.

7. A method, comprising:
   identifying, using an optimization model, a desired value for a parameter of an engine;
   detecting an operating value of the parameter of the engine based on one or more measurements received from a sensor system;
   determining, using an electronic control module, that a difference between the desired value and the operating value is outside of a threshold range; and
   adjusting, using an electronic control module, based on the difference, a position of an intake throttle valve to control a rotational speed of a turbocharger of the engine to reduce the difference between the desired value and the operating value.

8. The method of claim 7,
   wherein the parameter of the engine corresponds to the rotational speed of the turbocharger, and
   wherein the one or more measurements include a rotational speed measurement received from a speed sensor, associated with the turbocharger, of the sensor system.

9. The method of claim 7,
   wherein the parameter of the engine corresponds to an intake manifold pressure of the engine, and
   wherein the one or more measurements include a pressure measurement received from a pressure sensor, associated with an intake manifold of the engine, of the sensor system.

10. The method of claim 7,
    wherein the parameter of the ermine corresponds to an air-to-fuel ratio of the engine, and
    wherein the one or more measurements include a fuel measurement received from a fuel sensor, associated with an intake of the engine, of the sensor system.

11. The method of claim 7,
    wherein the parameter of the ermine corresponds to an emission level of the engine, and
    wherein the one or more measurements include an emission measurement received from an emission sensor, associated with an exhaust system of the engine, of the sensor system.

12. The method of claim 7, wherein identifying the desired value for the parameter of the ermine comprises:

determining, using the optimization model, an optimal value for the parameter of the ermine.

13. The method of claim 7, further comprising:
determining that the operational value is greater than the desired value,
wherein adjusting the position of the intake throttle valve comprises:
adjusting, based on determining that the operational value is greater than the desired value, the position of the intake throttle valve to cause air flow to the turbocharger to be reduced.

14. The method of claim 7, further comprising:
determining that the operational value is less than the desired value,
wherein causing the position of the intake throttle valve to be adjusted comprises:
adjusting, based on determining that the operational value is less than the desired value, the position of the intake throttle valve to cause air flow to the turbocharger to be increased.

15. The method of claim 7, wherein the parameter of the engine comprises at least one of:
the rotational speed of the turbocharger,
an intake manifold pressure of an intake of the engine, or
an air-to-fuel ratio measured at the intake of the engine.

16. A power system comprising:
an engine that includes a turbocharger and an intake throttle valve;
a sensor system; and
an electronic module configured to
identify a desired value for a parameter of the engine;
detect, based on a measurement from the sensor system, an operating value of the parameter of the engine; and
adjust, based on the desired value and the operating value, a position of the intake throttle valve to control a rotational speed of the turbocharger.

17. The power system of claim 16, wherein the electronic control module is further to:
determine a difference between the desired value and the operational value to control the position of the intake throttle valve based on the determined difference.

18. The power system of claim 16, wherein the parameter of the engine comprises at least one of:
the rotational speed of the turbocharger,
an intake manifold pressure of an intake of the engine, or
an air-to-fuel ratio measured at the intake of the engine.

19. The power system of claim 16, wherein, when identifying the desired value for the parameter of the engine using an optimization model, the electronic control module is configured to: optimize an operational metric of the engine being defined as an optimal value.

20. The power system of claim 16, wherein the intake throttle valve is positioned between a compressor of the turbocharger and an intake manifold of the engine.

\* \* \* \* \*